M. E. HILL.
MATCH LIGHTER.
APPLICATION FILED SEPT. 25, 1919.
1,336,698.
Patented Apr. 13, 1920.
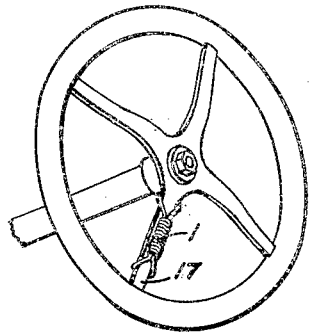
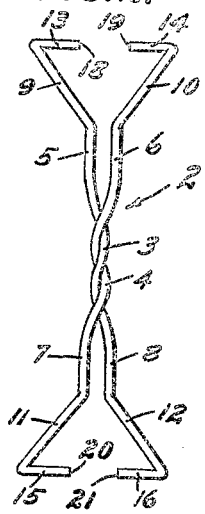
INVENTOR.
MELVIN E. HILL
BY
ATTORNEYS.

UNITED STATES PATENT OFFICE.

MELVIN E. HILL, OF LOS ANGELES, CALIFORNIA.

MATCH-LIGHTER.

1,336,698.  Specification of Letters Patent.  Patented Apr. 13, 1920.

Application filed September 25, 1919. Serial No. 326,293.

*To all whom it may concern:*

Be it known that I, MELVIN E. HILL, a citizen of the United States, residing at Los Angeles, in the county of Los Angeles and State of California, have invented new and useful Improvements in Match-Lighters, of which the following is a specification.

My invention relates to match lighters and consists of the novel features herein shown, described and claimed.

My object is to make a match lighter which may be readily attached to the steering wheel of an automobile and which may be easily removed therefrom.

Figure 1 is a perspective of the steering wheel of an automobile showing a match lighter embodying the principles of my invention in position for use.

Fig. 2 is a view in elevation of the frame for connecting the match lighter body to the spoke of the steering wheel.

Fig. 3 is a view in elevation of the frame and match lighter assembled ready for applying to the spoke of the steering wheel.

Fig. 4 is a side elevation looking in the direction indicated by the arrow 4 in Fig. 3.

The match lighter 1 is a coil of small, rough, steel wire. The frame 2 for attaching the match lighter 1 to the spoke of the steering wheel consists of two wires having their central portions 3 and 4 twisted together. The wires are then inserted through the match lighter 1 and the portions 5 and 6 and 7 and 8 of the wires extending from the ends of the twisted portions 3 and 4 are spread apart so that the coil fits closely upon the wires. After the wires have been inserted through the coil the end portions 9 and 10 at one end and 11 and 12 at the other end are bent outwardly to angles of about 45° relative to the axis of the coil and then the extreme end portions 13 and 14 at one end and 15 and 16 at the other end are bent inwardly at right angles to the axis.

The match lighter thus constructed is applied to the spoke 17 of the steering wheel by spreading the ends 13 and 14 apart until the spoke will pass between the points 18 and 19 and then releasing the ends to snap under the spoke; then the ends 20 and 21 are spread apart and passed by the sides of the spoke 17 and released, the tension of the wires held together by the coil will hold the match lighter securely in place.

In place of the coil of wire 1 a hollow metal cylinder having a roughened outer surface may be used.

Various changes may be made without departing from the spirit of my invention as claimed.

I claim:

1. A match lighter comprising a coil of rough steel wire, and a frame consisting of two wires twisted together at their centers, the wires extending through the coil and the ends of the wires being bent to embrace the spoke of an automobile steering wheel.

2. A match lighter comprising a frame consisting of two wires twisted together at their centers, a match lighting element mounted on said wires, the wires being bent outwardly from each other toward their ends to extend over the side edges of a steering wheel spoke and the extremities of said wires being bent inwardly transversely a short distance so that the ends of the wires may be spread apart to permit said extremities to pass over the spoke edges and snap under the spoke.

In testimony whereof I have signed my name to this specification.

MELVIN E. HILL.